US012359634B2

(12) United States Patent
Ni et al.

(10) Patent No.: US 12,359,634 B2
(45) Date of Patent: Jul. 15, 2025

(54) CLUTCH-TYPE AIR COMPRESSOR SYSTEM AND CONTROL METHOD AND CONTROL APPARATUS THEREOF

(71) Applicant: ZF COMMERCIAL VEHICLE SYSTEMS (QINGDAO) CO., LTD, Qingdao (CN)

(72) Inventors: Ronghua Ni, Qingdao (CN); Qiushuang Li, Qingdao (CN); Juan Zhu, Qingdao (CN)

(73) Assignee: ZF COMMERCIAL VEHICLE SYSTEMS (QINGDAO) CO., LTD., Qigdao (CN)

( * ) Notice: Subject to any disclaimer, the term of this patent is extended or adjusted under 35 U.S.C. 154(b) by 0 days.

(21) Appl. No.: 18/939,083

(22) Filed: Nov. 6, 2024

(65) Prior Publication Data

US 2025/0146448 A1 May 8, 2025

(30) Foreign Application Priority Data

Nov. 7, 2023 (CN) ......................... 202311475298.7

(51) Int. Cl.

*F02D 41/00* (2006.01)
*F02B 29/04* (2006.01)
*F02B 33/44* (2006.01)

(52) U.S. Cl.

CPC .......... *F02D 41/0007* (2013.01); *F02B 33/44* (2013.01); *F02B 29/04* (2013.01); *F02D 2200/101* (2013.01)

(58) Field of Classification Search

CPC ....... F02B 33/44; F02B 29/04; F02D 41/0007
See application file for complete search history.

(56) References Cited

FOREIGN PATENT DOCUMENTS

| | | | | | |
|---|---|---|---|---|---|
| FR | 2922162 | A1 | * | 4/2009 | ............... B60K 6/12 |
| JP | 2015151888 | A | * | 8/2015 | |
| JP | 2018193970 | A | * | 12/2018 | |

* cited by examiner

*Primary Examiner* — Ngoc T Nguyen
(74) *Attorney, Agent, or Firm* — WARNER NORCROSS + JUDD LLP

(57) ABSTRACT

A clutch-type air compressor system and a control method and control apparatus thereof. The clutch-type air compressor system includes a clutch-type air compressor, a natural aspiration pipeline connected to the atmosphere, a supercharged intake pipeline leading to an engine intake pipe, and an intake control valve disposed at a front end of an intake port of the clutch-type air compressor; the natural aspiration pipeline and the supercharged intake pipeline are connected to the intake port of the clutch-type air compressor via the intake control valve, and the intake control valve is allowed to switch on the natural aspiration pipeline or the supercharged intake pipeline alternatively.

11 Claims, 4 Drawing Sheets

CLUTCH-TYPE AIR COMPRESSOR SYSTEM AND CONTROL METHOD AND CONTROL APPARATUS THEREOF

CROSS-REFERENCE TO RELATED APPLICATIONS

This application claims priority to and all advantages of Chinese Application No. 202311475298.7 filed on 7 Nov. 2023, the contents of which are incorporated herein by reference.

TECHNICAL FIELD

The present invention relates to the technical field of air compressors, and in particular to a clutch-type air compressor system and a control method and control apparatus thereof.

BACKGROUND ART

Air compressors are capable of supplying compressed air to vehicles. A conventional air compressor draws air from a supercharged intake pipeline and has the advantages of a large displacement, a small size and light weight. However, due to the need of air snatch with an engine (the supercharged intake pipeline is configured to supply air to the engine), it will also consume engine power, resulting in high engine fuel consumption.

With the development of technology, clutch-type air compressors are gradually used in vehicles. With respect to a clutch-type air compressor, a clutch is integrated inside an air compressor, and the unloading of the air compressor is achieved through a disengagement function of the clutch, thus playing a role in saving on energy and reducing fuel consumption. The clutch-type air compressor uses a naturally aspirated mode, in which air is drawn from the atmosphere instead of from the supercharged intake pipeline, and accordingly it suffers from a small displacement. In order to meet the demand for displacement, clutch-type air compressors often use bipolar compression, resulting in a large size and heavy weight, which is not conducive to space arrangement.

It should be noted that information disclosed in the above background art section is only used to enhance the understanding of the background of the present invention, and therefore may include information that does not constitute the prior art known to those of ordinary skill in the art.

SUMMARY OF THE INVENTION

In view of this, the present invention provides a clutch-type air compressor system and a control method and control apparatus thereof, where an intake port of a clutch-type air compressor is connected to both a natural aspiration pipeline and a supercharged intake pipeline, and the natural aspiration pipeline or the supercharged intake pipeline is switched on alternatively via an intake control valve that is disposed at a front end of the intake port of the clutch-type air compressor, so that the clutch-type air compressor system has the advantages of a large displacement and a small size, as well as energy conservation and consumption reduction, and increased engine power.

According to an aspect of the present invention, provided is a clutch-type air compressor system, including a clutch-type air compressor, a natural aspiration pipeline connected to the atmosphere, and a supercharged intake pipeline leading to an engine intake pipe; wherein an intake port of the clutch-type air compressor is connected to the natural aspiration pipeline and the supercharged intake pipeline; and the clutch-type air compressor system further includes an intake control valve disposed at the front end of the intake port of the clutch-type air compressor, the natural aspiration pipeline and the supercharged intake pipeline are connected to the intake port of the clutch-type air compressor via the intake control valve, and the intake control valve is allowed to switch on the natural aspiration pipeline or the supercharged intake pipeline alternatively.

In some embodiments, the intake control valve includes a two-position five-way solenoid valve.

In some embodiments, the clutch-type air compressor system further includes: an air filter element, the natural aspiration pipeline and the supercharged intake pipeline being connected to the atmosphere via the air filter element.

In some embodiments, the clutch-type air compressor system further includes: a supercharger and an intercooler connected to each other and disposed in the supercharged intake pipeline, the supercharger being connected to the air filter element and the intercooler being connected to the engine intake pipe.

In some embodiments, the clutch-type air compressor system further includes: an air processing unit connected to the clutch-type air compressor.

In some embodiments, the clutch-type air compressor is a single-cylinder air compressor or a multi-cylinder air compressor.

According to another aspect of the present invention, provided is a control method of a clutch-type air compressor system, for controlling the clutch-type air compressor system as described in any of the above embodiments, and the control method includes: determining whether an engine speed is within a set interval; if so, controlling the intake control valve to switch on the supercharged intake pipeline such that the clutch-type air compressor is brought into a supercharged intake state; and if not, controlling the intake control valve to switch on the natural aspiration pipeline such that the clutch-type air compressor is brought into a naturally aspirated state.

In some embodiments, the set interval ranges from 600 rpm to 2100 rpm.

In some embodiments, determining whether an engine speed is within a set interval includes: determining whether the engine speed is lower than a minimum value of the set interval; if the engine speed is lower than the minimum value of the set interval, controlling the intake control valve to switch on the natural aspiration pipeline such that the clutch-type air compressor is brought into a naturally aspirated state; if the engine speed is not lower than the minimum value of the set interval, continuing to determine whether the engine speed is higher than a maximum value of the set interval; if the engine speed is higher than the maximum value of the set interval, controlling the intake control valve to switch on the natural aspiration pipeline such that the clutch-type air compressor is brought into a naturally aspirated state; and if the engine speed is not higher than the maximum value of the set interval, controlling the intake control valve to switch on the supercharged intake pipeline such that the clutch-type air compressor is brought into a supercharged intake state.

In some embodiments, before determining whether an engine speed is within a set interval, the control method further includes: determining an operating state of a clutch of the clutch-type air compressor; and when the clutch is in an engaged state, performing the step of determining whether an engine speed is within a set interval.

According to another aspect of the present invention, provided is a control apparatus of a clutch-type air compressor system, and the control apparatus is configured to implement the control method as described in any of the above embodiments.

Compared with the prior art, the present invention has at least the following beneficial effects.

In the clutch-type air compressor system of the present invention, the intake port of the clutch-type air compressor is connected to both the natural aspiration pipeline and the supercharged intake pipeline, and the natural aspiration pipeline or the supercharged intake pipeline is switched on alternatively via the intake control valve that is disposed at the front end of the intake port of the clutch-type air compressor, thereby allowing the clutch-type air compressor to achieve air intake from the supercharged intake pipeline to increase the pumping efficiency and volume when the engine intake is sufficient, and allowing the clutch-type air compressor to draw air from the natural aspiration pipeline to avoid affecting the engine when the engine intake needs to be ensured. In this way, the clutch-type air compressor system of the present invention has the advantages of a large displacement and a small size, as well as energy conservation and consumption reduction, and increased engine power.

In addition, the clutch-type air compressor stops running in an unloaded state to stop taking air from the supercharged intake pipeline, thereby avoiding air snatch with the engine, and further increasing engine power and reducing fuel consumption.

It should be understood that the above general description and the following detailed description are only exemplary and explanatory, and cannot limit the present invention.

BRIEF DESCRIPTION OF THE DRAWINGS

The accompanying drawings herein, which are incorporated into and constitute a part of the description, illustrate embodiments consistent with the present invention and, together with the description, are used to explain principles of the present invention. Obviously, the accompanying drawings described below show merely some of the embodiments of the present invention, and those of ordinary skill in the art would also have obtained other accompanying drawings according to these accompanying drawings without any creative effort.

DETAILED DESCRIPTION OF EMBODIMENTS

Figure 1:
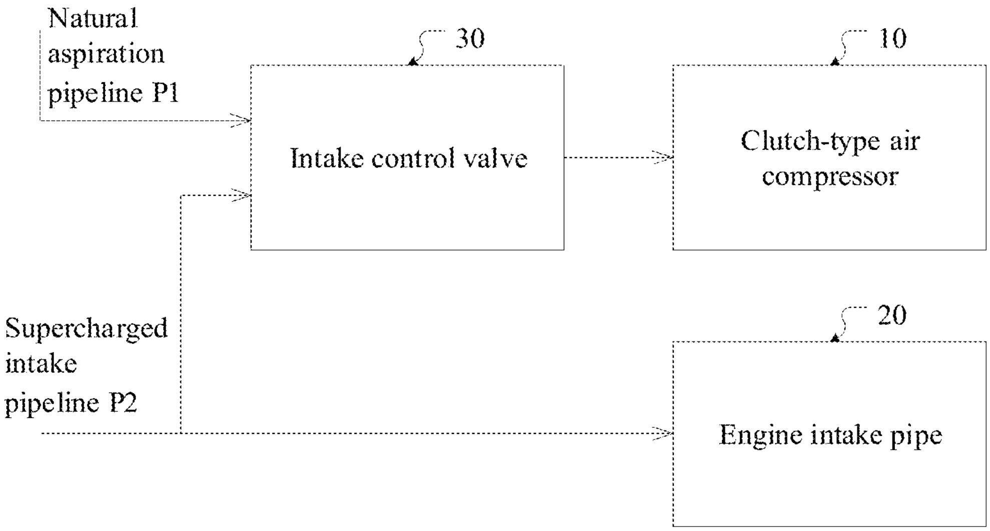
FIG. 1 shows a schematic diagram of a structure of a clutch-type air compressor system according to an embodiment of the present invention.

Now exemplary implementations will be described more fully with reference to the accompanying drawings. However, the exemplary implementations can be implemented in many forms and should not be construed as being limited to the implementations set forth herein. On the contrary, these implementations are provided to make the present invention thorough and complete, and to fully convey the concept of the exemplary implementations to those skilled in the art.

The accompanying drawings are only schematic illustrations of the present invention, and are not necessarily drawn to scale. In the accompanying drawings, the same reference numerals denote the same or similar parts, and thus the repeated description thereof will be omitted. Some block diagrams shown in the accompanying drawings are functional entities, which do not necessarily correspond to physically or logically independent entities. These functional entities may be implemented in the form of software, in one or more hardware modules or integrated circuits, or in different networks and/or processor apparatuses and/or micro-controller apparatuses.

The processes shown in the accompanying drawings are only exemplary illustrations, and do not necessarily include all steps. For example, some steps can be divided, and some steps can be combined or partially combined, and the actual execution order thereof may be changed based on actual conditions.

It should be noted that the embodiments in the present invention and features of the various embodiments can be combined with each other without conflict.

FIG. 1 shows a main structure of a clutch-type air compressor system according to an embodiment of the present invention. As shown in FIG. 1, the clutch-type air compressor system provided in the embodiment of the present invention includes:

a clutch-type air compressor 10, a natural aspiration pipeline P1 connected to the atmosphere, and a supercharged intake pipeline P2 leading to an engine intake pipe 20, an intake port of the clutch-type air compressor 10 being connected to the natural aspiration pipeline P1 and the supercharged intake pipeline P2;

and an intake control valve 30 disposed at a front end of the intake port of the clutch-type air compressor 10, where the natural aspiration pipeline P1 and the supercharged intake pipeline P2 are connected to the intake port of the clutch-type air compressor 10 via the intake control valve 30, and the intake control valve 30 is allowed to switch on the natural aspiration pipeline P1 or the supercharged intake pipeline P2 alternatively.

In the clutch-type air compressor system described above, the intake port of the clutch-type air compressor 10 is connected to both the natural aspiration pipeline P1 and the supercharged intake pipeline P2, and the natural aspiration pipeline P1 or the supercharged intake pipeline P2 is switched on alternatively via the intake control valve 30 that is disposed at the front end of the intake port of the clutch-type air compressor 10, thereby allowing the clutch-type air compressor 10 to achieve air intake from the supercharged intake pipeline P2 to increase the pumping efficiency and volume when engine intake is sufficient, and allowing the clutch-type air compressor 10 to draw air from the natural aspiration pipeline P1 to avoid affecting an engine when the engine intake needs to be ensured. In this way, the clutch-type air compressor system described above has the advantages of a large displacement and a small size, as well as energy conservation and consumption reduction, and increased engine power.

In addition, the clutch-type air compressor 10 stops running in an unloaded state to stop taking air from the supercharged intake pipeline P2, thereby avoiding air snatch with the engine, and further increasing engine power and reducing fuel consumption.

For a specific product implementation, the intake control valve 30 may be a valve disposed at the front end of the intake port of the clutch-type air compressor 10, and the natural aspiration pipeline P1 and the supercharged intake pipeline P2 are connected to different air lines of the intake control valve 30, respectively. Alternatively, the intake control valve 30 may include more than two valves disposed in the natural aspiration pipeline P1 and the supercharged intake pipeline P2, respectively.

In some embodiments, the intake control valve 30 includes a two-position five-way solenoid valve. The two-position five-way solenoid valve is disposed at the front end of the intake port of the clutch-type air compressor 10, and the natural aspiration pipeline P1 and the supercharged intake pipeline P2 are connected to different air lines of the two-position five-way solenoid valve to realize that: in an operating state, the two-position five-way solenoid valve switches on the natural aspiration pipeline P1 and cuts off the supercharged intake pipeline P2, so that the clutch-type air compressor 10 draws air from the natural aspiration pipeline P1, and at this time, the supercharged intake pipeline P2 supplies air only to the engine intake pipe 20 to ensure engine power; and in another operating state, the two-position five-way solenoid valve switches on the supercharged intake pipeline P2 and cuts off the natural aspiration pipeline P1, so that the clutch-type air compressor 10 draws air from the supercharged intake pipeline P2, and then the pumping efficiency of the clutch-type air compressor 10 can be improved.

Figure 2:
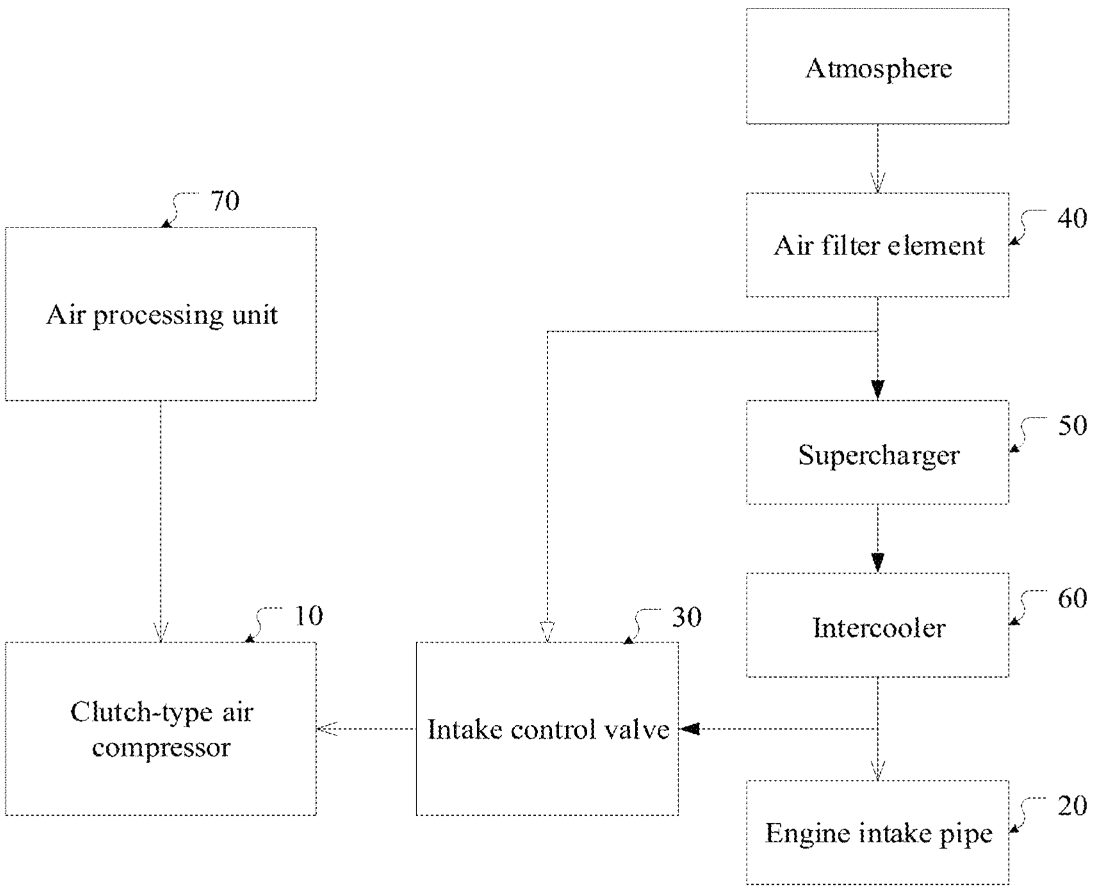
FIG. 2 shows a schematic diagram of a layout of a clutch-type air compressor system according to an embodiment of the present invention.

FIG. 2 shows a specific layout of a clutch-type air compressor system according to an embodiment of the present invention. As shown in FIGS. 1 and 2, in some embodiments, the clutch-type air compressor system further includes: an air filter element 40, where the natural aspiration pipeline P1 and the supercharged intake pipeline P2 (in FIG. 2, the supercharged intake pipeline P2 is mainly shown with a solid arrow and the natural aspiration pipeline P1 is shown with a hollow arrow) are connected to the atmosphere via the air filter element 40.

By means of the air filter element 40, air entering the entire vehicle is filtered and purified to ensure clean air fed to subsequent components, including the clutch-type air compressor 10 and the engine intake pipe 20.

In some embodiments, the clutch-type air compressor system further includes: a supercharger 50 and an intercooler 60 connected to each other and disposed in the supercharged intake pipeline P2, the supercharger 50 being connected to the air filter element 40 and the intercooler 60 being connected to the engine intake pipe 20.

The supercharger 50 may achieve air supercharging in a turbocharging manner. The intercooler 60, as auxiliary equipment for turbocharging, is configured to cool high-temperature air after the supercharging, so as to reduce a thermal load of the engine, increase the air intake, and thus increase the engine power.

The clutch-type air compressor 10 is arranged at a rear end of the intercooler 60, and can draw air during the turbocharging to improve the pumping efficiency, thus meeting the demands for a large displacement, light weight and a small size.

In some embodiments, the clutch-type air compressor system further includes: an air processing unit (APU) 70 connected to the clutch-type air compressor 10. The air processing unit 70 is configured to provide an air pressure signal to the clutch-type air compressor 10 to control the start and stop of the clutch-type air compressor 10.

In some embodiments, the clutch-type air compressor 10 is a single-cylinder air compressor. Since the clutch-type air compressor 10 is arranged at the rear end of the intercooler 60, it is possible to greatly increase the pumping volume of the clutch-type air compressor 10, and accordingly the use of a single-cylinder air compressor can meet the demand for displacement. In some embodiments, the clutch-type air compressor 10 is a multi-cylinder air compressor, for example, an air compressor with two cylinders or more cylinders, in order to meet higher demand for displacement.

An embodiment of the present invention further provides a control method of a clutch-type air compressor system, for controlling the clutch-type air compressor system as described in any of the above embodiments. Features and principles of the clutch-type air compressor system as described in any of the above embodiments are both applicable to embodiments of the control method of the clutch-type air compressor system. In the following embodiments of the control method, the features and principles of the clutch-type air compressor system that have been described will not be repeated again.

Figure 3:
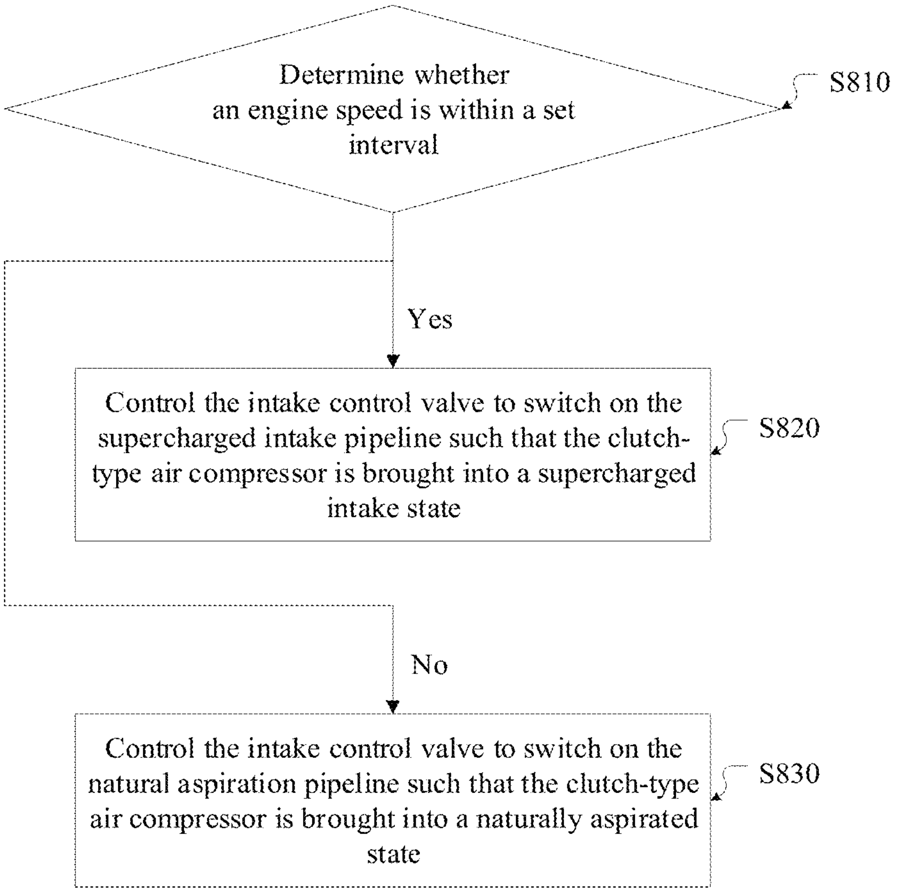
FIG. 3 shows a schematic diagram of steps of a control method of a clutch-type air compressor system according to an embodiment of the present invention.

FIG. 3 shows main steps of a control method of a clutch-type air compressor system according to an embodiment of the present invention. As shown in FIG. 1 to FIG. 3, the control method of the clutch-type air compressor system provided in the embodiment of the present invention includes:

- S810: determining whether an engine speed is within a set interval;
- S820: if so, controlling the intake control valve 30 to switch on the supercharged intake pipeline P2 such that the clutch-type air compressor 10 is brought into a supercharged intake state;
- S830: if not, controlling the intake control valve 30 to switch on the natural aspiration pipeline P1 such that the clutch-type air compressor 10 is brought into a naturally aspirated state.

The set interval may be set to different values for different vehicles. For the same vehicle, different set intervals may also be available under different driving conditions to meet the requirements of engine intake under different driving conditions. When the engine speed is within the set interval, it indicates that the engine intake is sufficient at this time, and the supercharged intake pipeline P2 can be switched on to allow the clutch-type air compressor 10 to perform supercharged intake, thereby improving the pumping efficiency of the clutch-type air compressor 10. If the engine speed is less than the set interval, it indicates that the engine intake is insufficient at this time, and the clutch-type air compressor 10 performs natural aspiration to avoid air snatch with the engine. If the engine speed is greater than the set interval, the engine runs at a high speed at this time to drive the clutch-type air compressor 10 to run at a high speed, and then the clutch-type air compressor 10 can also meet the pumping requirement without supercharged intake.

In one embodiment, when the engine speed is between 600 rpm and 2100 rpm, the clutch-type air compressor 10 is brought into a supercharged intake state. That is, in this embodiment, the set interval ranges from 600 rpm to 2100 rpm, and correspondingly, a rotational speed of the clutch-type air compressor 10 is about 1000 rpm to 2500 rpm (the specific rotational speed value of the compressor depends on the transmission).

Specifically, turbocharging intervention will occur when the engine rotates at a high speed (>2100 rpm), and an intervention speed is related to the displacement of the engine, with the main purpose of increasing the power and torque of the engine. Therefore, when the speed of the clutch-type air compressor 10 is in a high speed interval that defines the turbocharging intake, it should consider the overall requirements on the engine power and torque, and avoid air snatch with the engine at high speeds. When the engine rotates at a low speed (600 rpm to 2100 rpm), the engine does not need the intervention of the turbocharging intake, and turbocharged air can be fed to the clutch-type air compressor 10 through the intake control valve 30, thereby realizing large-displacement pumping of the clutch-type air compressor 10. When the engine speed is very low (<600 rpm), the engine intake is insufficient, then the clutch-type air compressor 10 performs natural aspiration to avoid air snatch with the engine.

In some embodiments, before determining whether an engine speed is within a set interval, the control method may further include: determining an operating state of a clutch of the clutch-type air compressor 10; and when the clutch is in an engaged state, performing the step of determining whether an engine speed is within a set interval.

In some embodiments, determining whether an engine speed is within a set interval may specifically include: determining whether the engine speed is lower than a minimum value of the set interval; if the engine speed is lower than the minimum value of the set interval, controlling the intake control valve 30 to switch on the natural aspiration pipeline P1 such that the clutch-type air compressor 10 is brought into a naturally aspirated state; if the engine speed is not lower than the minimum value of the set interval, continuing to determine whether the engine speed is higher than a maximum value of the set interval; if the engine speed is higher than the maximum value of the set interval, controlling the intake control valve 30 to switch on the natural aspiration pipeline P1 such that the clutch-type air compressor 10 is brought into a naturally aspirated state; and if the engine speed is not higher than the maximum value of the set interval, controlling the intake control valve 30 to switch on the supercharged intake pipeline P2 such that the clutch-type air compressor 10 is brought into a supercharged intake state.

Figure 4:
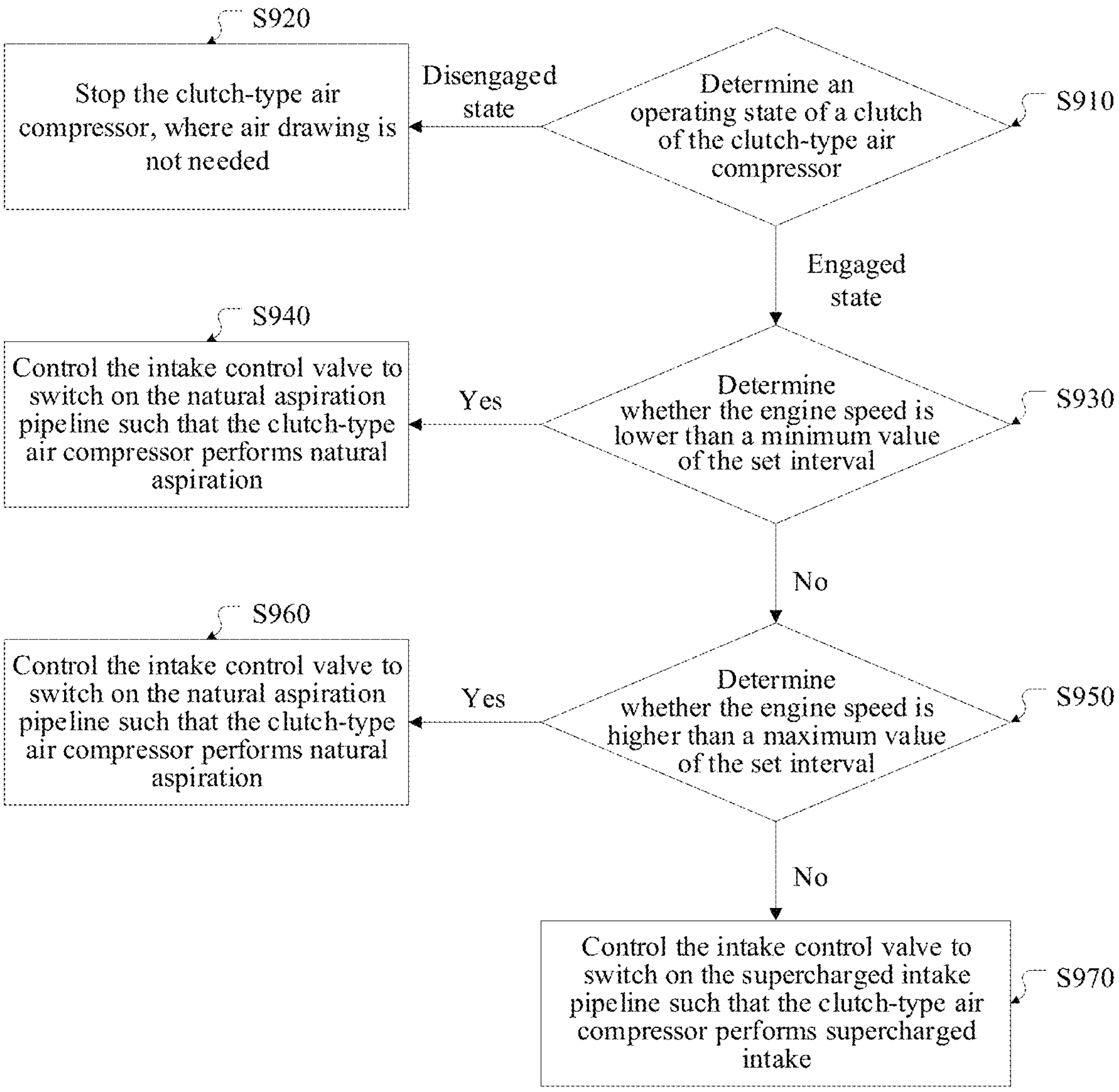
FIG. 4 shows a schematic flow diagram of a control method of a clutch-type air compressor system according to an embodiment of the present invention.

FIG. 4 shows a specific process of a control method of a clutch-type air compressor system according to an embodiment of the present invention. As shown in FIG. 1 to FIG. 4, in some embodiments, the implementation of a control method of a clutch-type air compressor system may include the following steps:

- S910: determining an operating state of a clutch of the clutch-type air compressor 10;
- S920: when the clutch is in a disengaged state, stopping the clutch-type air compressor 10, where air drawing is not needed;
- S930: when the clutch is in an engaged state, continuing to determine whether an engine speed is lower than a minimum value of a set interval;
- S940: in the case that the engine speed is lower than the minimum value of the set interval, controlling the intake control valve 30 to switch on the natural aspiration pipeline P1 such that the clutch-type air compressor 10 performs natural aspiration;
- S950: in the case that the engine speed is not lower than the minimum value of the set interval, continuing to determine whether the engine speed is higher than a maximum value of the set interval;
- S960: if the engine speed is higher than the maximum value of the set interval, controlling the intake control valve 30 to switch on the natural aspiration pipeline P1 such that the clutch-type air compressor 10 performs natural aspiration;
- S970: if the engine speed is not higher than the maximum value of the set interval, controlling the intake control valve 30 to switch on the supercharged intake pipeline P2 such that the clutch-type air compressor 10 performs supercharged intake.

Based on the above control logics, different driving conditions are satisfied, and the clutch-type air compressor system has the advantages of a large displacement, a high pumping efficiency, light weight and a small size.

The control method of the clutch-type air compressor system of the present invention may be performed by a vehicle controller, such as an electronic control unit (ECU). An embodiment of the present invention further provides a control apparatus of a clutch-type air compressor system, which may be configured to implement the control method described in any of the above embodiments, thereby switching on the supercharged intake pipeline P2 to allow the clutch-type air compressor 10 to achieve air intake from the supercharged intake pipeline P2 to increase the pumping efficiency and volume when the engine intake is sufficient, and switching on the natural aspiration pipeline P1 to allow the clutch-type air compressor 10 to perform natural aspiration when the engine intake needs to be ensured or when supercharged intake is not needed. In this way, the clutch-type air compressor system has the advantages of a large displacement and a small size, as well as energy conservation and consumption reduction, and increased engine power.

The control apparatus of the clutch-type air compressor system may be independently assembled in the vehicle or may be integrated in the vehicle controller, such as the electronic control unit. The control apparatus of the clutch-type air compressor system may be implemented in the following forms.

The control apparatus, in the form of a functional (program) module architecture, may include modules for separately implementing respective steps of the control method of the clutch-type air compressor system described above, such as including modules for separately implementing the steps S810, S820, and S830.

The control apparatus, in the form of a general purpose computing device, may include a processing unit and a storage unit in which executable instructions are stored. When the executable instructions are executed by the processing unit, the control method of the clutch-type air compressor system as described in any of the embodiments described above is implemented.

The storage unit may include a program/utility having one or more program modules including but not limited to: an operating system, one or more applications, other program modules, and program data. The general purpose computing device further includes a bus for connecting the processing unit, the storage unit, and other platform components, and the bus may include a storage unit bus, a peripheral bus, a graphics acceleration port, a processing unit bus, and other local buses. The general purpose computing device may also communicate with one or more external devices, other computing devices of the vehicle, a network (e.g., a local area network (LAN), a wide area network (WAN), and/or a public network, such as the Internet), etc.

The control apparatus, in the form of a storage medium, stores a program. When the program is executed, the control method of the clutch-type air compressor system as described in any of the embodiments described above is implemented.

The storage medium may be any tangible medium containing or storing a program, in particular any combination of one or more readable media. The readable medium may be a readable signal medium or a readable storage medium. The program may be used by or in combination with an instruction execution system, apparatus or means. The program may be completely executed on a user computing device, partially executed on a user device, executed as a separate software package, partially executed on a user computing device and partially executed on a remote computing device, or completely executed on a remote computing device or server. In the case of a remote computing device, the remote computing device may be connected to the user computing device via any kind of network, including a local area network (LAN) or a wide area network (WAN), or may be connected to an external computing device (for example, connected via the Internet with the aid of an Internet service provider).

The above is a further detailed description of the present invention with reference to the specific preferred implementations, and it cannot be considered that the specific implementation of the present invention is limited to these descriptions. For those of ordinary skill in the art of the present invention, several simple deductions or substitutions can be further made without departing from the concept of the present invention, and should be regarded as falling within the scope of protection of the present invention.

The invention claimed is:

1. A clutch-type air compressor system, comprising a clutch-type air compressor, a natural aspiration pipeline connected to the atmosphere, and a supercharged intake pipeline leading to an engine intake pipe;

wherein an intake port of the clutch-type air compressor is connected to the natural aspiration pipeline and the supercharged intake pipeline; and the clutch-type air compressor system further comprises an intake control valve disposed at the front end of the intake port of the clutch-type air compressor, the natural aspiration pipeline and the supercharged intake pipeline are connected to the intake port of the clutch-type air compressor via the intake control valve, and the intake control valve is allowed to switch on the natural aspiration pipeline or the supercharged intake pipeline alternatively.

2. The clutch-type air compressor system according to claim 1, wherein the intake control valve comprises a two-position five-way solenoid valve.

3. The clutch-type air compressor system according to claim 1, wherein the clutch-type air compressor system further comprises:

an air filter element, the natural aspiration pipeline and the supercharged intake pipeline being connected to the atmosphere via the air filter element.

4. The clutch-type air compressor system according to claim 3, wherein the clutch-type air compressor system further comprises:

a supercharger and an intercooler connected to each other and disposed in the supercharged intake pipeline, the supercharger being connected to the air filter element and the intercooler being connected to the engine intake pipe.

5. The clutch-type air compressor system according to claim 1, wherein the clutch-type air compressor system further comprises:

an air processing unit connected to the clutch-type air compressor.

6. The clutch-type air compressor system according to claim 1, wherein the clutch-type air compressor is a single-cylinder air compressor or a multi-cylinder air compressor.

7. A control method of a clutch-type air compressor system, for controlling a clutch-type air compressor system according to claim 1, the control method comprising:

determining whether an engine speed is within a set interval;

if so, controlling the intake control valve to switch on the supercharged intake pipeline such that the clutch-type air compressor is brought into a supercharged intake state; and if not, controlling the intake control valve to switch on the natural aspiration pipeline such that the clutch-type air compressor is brought into a naturally aspirated state.

8. The control method according to claim 7, wherein the set interval ranges from 600 rpm to 2100 rpm.

9. The control method according to claim 7, wherein determining whether an engine speed is within a set interval comprises:

determining whether the engine speed is lower than a minimum value of the set interval;

if the engine speed is lower than the minimum value of the set interval, controlling the intake control valve to switch on the natural aspiration pipeline such that the clutch-type air compressor is brought into a naturally aspirated state;

if the engine speed is not lower than the minimum value of the set interval, continuing to determine whether the engine speed is higher than a maximum value of the set interval;

if the engine speed is higher than the maximum value of the set interval, controlling the intake control valve to switch on the natural aspiration pipeline such that the clutch-type air compressor is brought into a naturally aspirated state; and if the engine speed is not higher than the maximum value of the set interval, controlling the intake control valve to switch on the supercharged intake pipeline such that the clutch-type air compressor is brought into a supercharged intake state.

10. The control method according to claim 7, wherein before determining whether an engine speed is within a set interval, the control method further comprises:

determining an operating state of a clutch of the clutch-type air compressor; and when the clutch is in an engaged state, performing the step of determining whether an engine speed is within a set interval.

11. A control apparatus of a clutch-type air compressor system, the control apparatus being configured to implement a control method according to claim 7.

* * * * *